(12) United States Patent
Pullen et al.

(10) Patent No.: US 9,380,104 B2
(45) Date of Patent: Jun. 28, 2016

(54) MEDIA PLAYER WEB SERVICE

(75) Inventors: Benjamin Allen Pullen, Redmond, WA (US); Cameron DeShawn Jiles, Indianapolis, IN (US); James Michael Hodapp, Indianapolis, IN (US)

(73) Assignee: THOMSON LICENSING, Issy les Moulineaux (FR)

( * ) Notice: Subject to any disclaimer, the term of this patent is extended or adjusted under 35 U.S.C. 154(b) by 643 days.

(21) Appl. No.: 13/325,518

(22) Filed: Dec. 14, 2011

(65) Prior Publication Data

US 2012/0317473 A1  Dec. 13, 2012

Related U.S. Application Data

(60) Provisional application No. 61/424,966, filed on Dec. 20, 2010.

(51) Int. Cl.
*G06F 15/173* (2006.01)
*H04L 29/08* (2006.01)
*H04L 29/06* (2006.01)

(52) U.S. Cl.
CPC ............ *H04L 67/02* (2013.01); *H04L 65/4084* (2013.01); *H04L 65/608* (2013.01)

(58) Field of Classification Search
CPC .... H04L 65/4084; H04L 67/02; H04L 65/608
USPC ........................................................ 709/224
See application file for complete search history.

(56) References Cited

U.S. PATENT DOCUMENTS

| | | | |
|---|---|---|---|
| 7,035,828 B2 | 4/2006 | Ketonen et al. | |
| 7,107,045 B1 | 9/2006 | Knoop | |
| 7,124,125 B2 | 10/2006 | Cook et al. | |
| 2003/0236907 A1* | 12/2003 | Stewart | H04L 29/06 709/231 |
| 2004/0221055 A1* | 11/2004 | Liebenow | H04N 7/17318 709/231 |
| 2012/0023529 A1* | 1/2012 | Azam et al. | 725/93 |

* cited by examiner

*Primary Examiner* — Hee Soo Kim
(74) *Attorney, Agent, or Firm* — Brian J. Dorini; Jeffrey M. Navon

(57) ABSTRACT

Methods for configuring playback for local or remote rendering in an HTML5 UI. The methods include determining a client type, transmitting a request to a content management server (CMS) for Get media metadata, receiving Get media metadata from the CMS, determining video format for a client, constructing a media URL, and constructing the HTML 5 page.

4 Claims, 4 Drawing Sheets

MEDIA PLAYER WEB SERVICE

CROSS REFERENCE TO RELATED APPLICATIONS

This application claims the benefit of U.S. provisional application No. 61/424,966 filed Dec. 20, 2010, the content of which is hereby incorporated by reference herein as if fully set forth.

BACKGROUND

Several questions have arisen in HTTP streaming of video content which have not yet been addressed in the art. In particular, it is often difficult to detect the end of life for a route, and more particularly the question exists whether a disconnect is sufficient to detect the end of life.

Moreover, WebService communication with a Media Presentation Manager has not been sufficiently defined and implemented in prior HTTP streaming systems. Other problems that have not been fully addressed in the art are, for example, whether an HTTP redirect is safe for all clients, or is it necessary to pass an open socket, and what is the proper format request for a URL. Additionally, it must be determined how the HTML5 User Interface (UI) will interact with a route outside of playback, for example in a channel change. Also, the art has not adequately implanted a library in an adequate fashion to share knowledge about how to construct necessary URLs.

These and other problems in the HTTP streaming art have not been solved, and long-felt needs therefore exist in the art for such solutions. A media player may solve the long-felt need with the provision of a system and method that provide a media player service which is configurable to allowing local or remote rendering of content to clients. A media player may support HTML5 video tagging for HTTP steaming. A media player and media player services may stream content from all available source, for example, from local media, television, recorded content, and other sources. A media player and services may support transcoding to format appropriate remote clients.

SUMMARY

A system and method for configuring playback for local or remote rendering in an HTML5 UI. The method includes determining a client type, transmitting a request to a content management server (CMS) for Get media metadata, receiving Get media metadata from the CMS, determining video format for a client, constructing a media URL, and constructing the HTML 5 page.

BRIEF DESCRIPTION OF THE DRAWINGS

A more detailed understanding may be had from the following description, given by way of example in conjunction with the accompanying drawings wherein.

DETAILED DESCRIPTION

It is to be understood that the figures and descriptions of embodiments have been simplified to illustrate elements that are relevant for a clear understanding of the invention, while eliminating other elements and steps that are well known in the art and do not facilitate a better understanding of the present invention.

Media servers may be implemented on set-top boxes, gateways, or other devices having video processing capabilities. Remote media players may be televisions, personal video recorders, hand-held devices, mobile devices, or other devices which may output video content.

Figure 1:
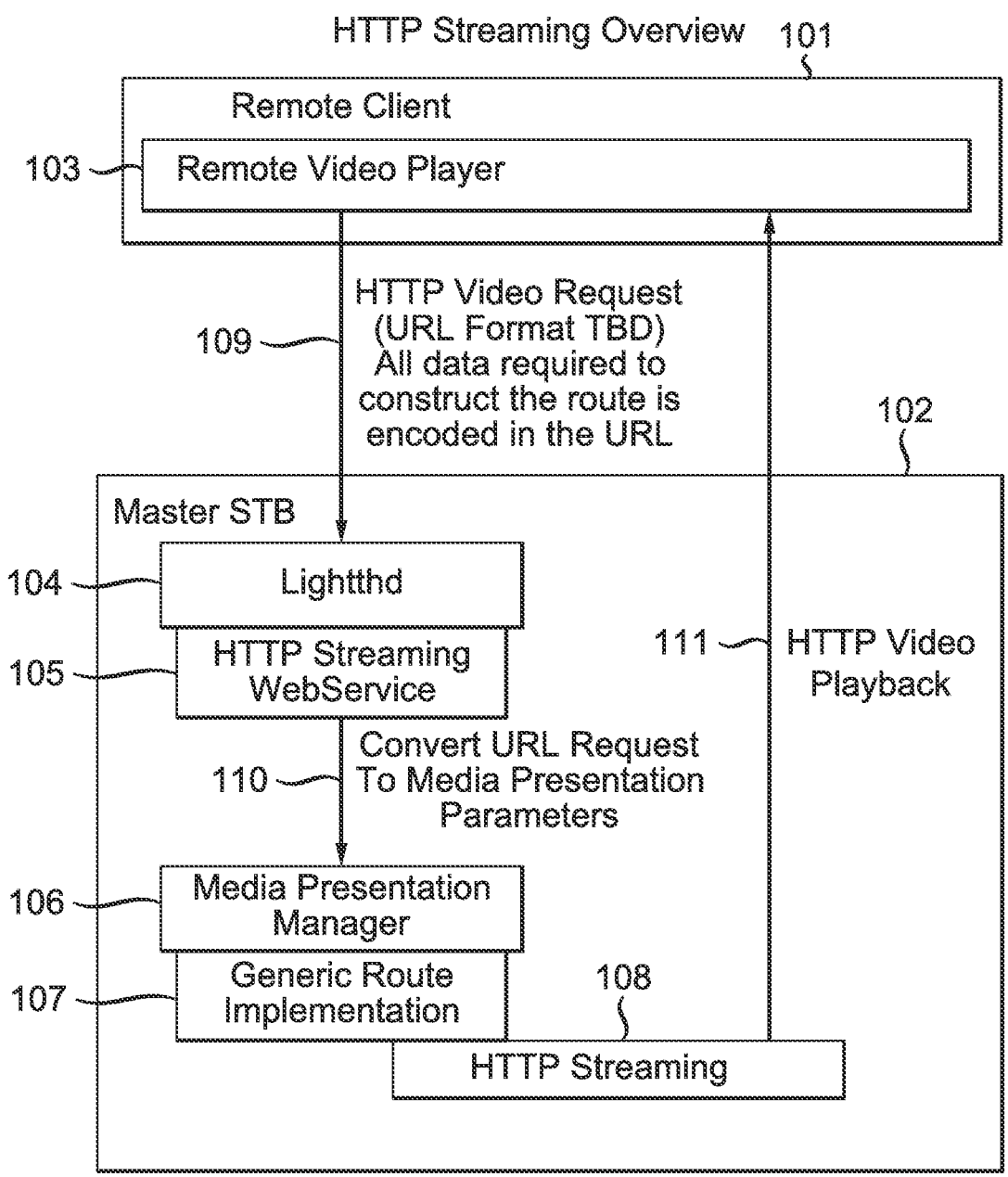
FIG. 1 is a block diagram of a media server employing the invention in communication with a remote player which receives content for playback that has been configured.

FIG. 1 is an overview of HTTP streaming. Remote Client 101 communicates with a Master set-top box (Master STB) 102. Remote Client 101 includes a remote video player 103. Master STB 102 includes a number of applications and functions including a Web server such as lightthd 104, Hypertext Transfer Protocol (HTTP) streaming Web Service 105, media presentation manager 106, generic route module 107, and HTTP streaming module 108. Remote video player 103 transmits an HTTP video request 109 to lightthd 104 in the form of a URL. The data required to construct the route is encoded in the URL. The HTTP streaming Web Service 105 converts the URL request to media presentation parameters and transmits the media presentation parameters 110 to the media presentation manager 106. The media presentation manager 106 transmits the media presentation parameters 110 to the HTTP streaming module 108 via the generic route module 107. The HTTP streaming module 108 transmits HTTP video playback 111 to the remote video player 103.

As described herein, an HTTP get of the defined uniform resource locator (URL) should result in the requested media player being created and started. For example, an URL format may be:

http://<ip of STB>/MediaPlayer?source=<video source>&sink=<video sink>&transcode=<transcode target>&title=<stream title>.

All common gateway interface (CGI) query arguments must be URL encoded. URL encoding should happen automatically with a browser. Example CGI arguments are source, output, transcode, title, playlist-duration, and segment-duration. These are further described herein below.

A source is the source of the video to play. This is a URL of the source. For example, a URL source may be dvb://ffff.99dc.1 (an installed service, such as atsc, udp, etc.), udp://239.255.1.18:1234 (a udp multicast source, file:///mnt/hdd0/video1.ts, or http://www.technicolor.com/videos/1.mp4.

An output is the destination for playback. For example, destination playback may be decode (local decode), http (simple http output), httplive (Apple's http live playback), and udp (UDP output).

A transcode is the required transcoding option. The format for the transcoding option may be [CBR/VBR]_Bitrate in MBPS]_[H.264 Main Profile]:[aspect]. Currently, supported combinations for transcoding are VBR_8MBPS_31:1080p, VBR_4MBPS_31:720p, and CBR_2MBPS_31:480p.

Figure 2:
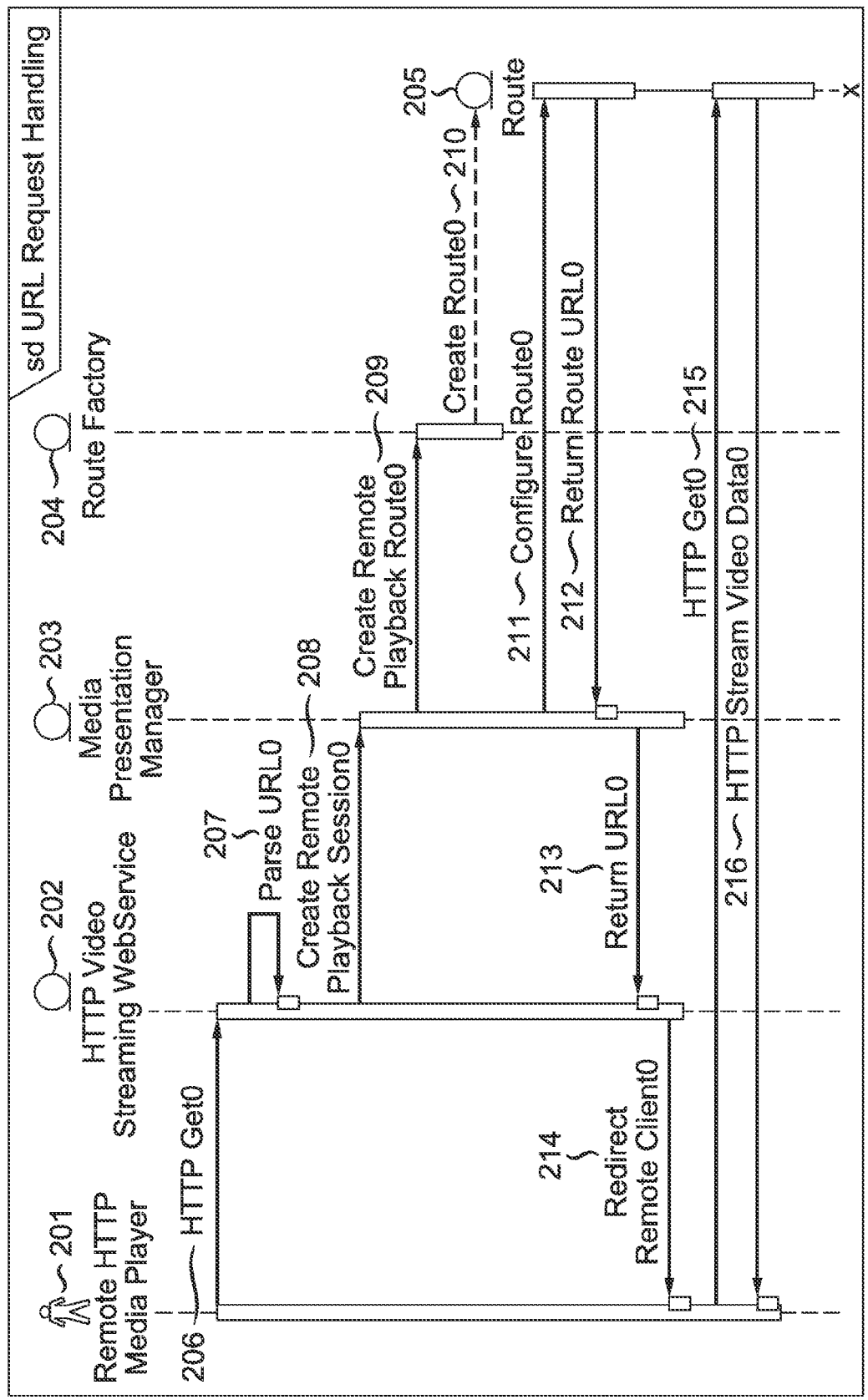
FIG. 2 is a flow chart illustrating handling of the remote request for HTTP streaming as shown in FIG. 1.

For example a transcoding option is shown with respect to FIG. 2. FIG. 2 is a video request URL handling process. Remote HTTP media player 201 transmits HTTP get 206 to HTTP video streaming WebService 202. HTTP video streaming WebService 202 parses URL 206 and transmits a create remote playback session message 208 to media presentation manager 203. Media presentation manager 203 transmits a create remote playback route message 209 to route factory 204. Route factory 204 transmits a create route message 210 to route 205. Media presentation manager 203 transmits a create route message 211 to route 205. Route 205 then transmits a return route uniform resource identifier (URI) 212 to media presentation manager 203. Media presentation manager 203 transmits return URI 213 to HTTP video streaming WebService 202. HTTP video streaming WebService 202 transmits redirect remote client 214 to remote HTTP media player 201. Remote HTTP media player 201 transmits HTTP get 215 to route 205. Route 205 transmits HTTP stream video data 216 to remote HTTP media player 201.

A title is the stream title, which is optional. This is the title that will go into http live playlists for display in the media player.

A playlist-duration is the duration in seconds the sliding window for httplive playback should be. The default play-list duration is 60 seconds.

A segment-duration is the default file segment length in second for httplive playback. The default segment-duration is 10 seconds.

For successful operation of the http get command, if the allocation of resources and media playback should be ready, the client will receive an HTTP redirect to the resulting stream as illustrated in FIG. 1. For local decode, no redirect will occur.

In addition, a cookie must be set in the http header so that the client may locate the media player instance. The name of the cookie shall be "MediaPlayerObject" and the value will be the locator for the media player instance. An example of a http header may be:

HTTP/1.1 200 OK
Content-type: text/html
Set-Cookie: MediaPlayerObject=/Zinc/Media/MediaRouter/1

For a failed operation of the http get command, any failure to create to allocate the resources or parse the arguments will result in an HTTP 500 Internal Service Error returned to the client.

For interactions with a DBus media router, once a URL is parsed successfully, the following sequence should take place with the canvas MediaRouterFactory and media router. MediaRouterFactory creates a media router. The media router sets source and sink. The sink contains the aggregate of output/transcode/title CGI inputs along with the IP address the request was received on. The IP address may be used by the output service to determine what interface to stream data back out. If the destination is decode, a sink string should simply be "decode." Otherwise, it will be output type following key=""value" pairs separated by a semi-colon. If quotes or backslashes are part of the value string, they must be escaped with a backslash. Example of a value string may be "decode", "httplive:transcode=h.264@720p:title=" Where the wild things are":ip="192.168.0.1"", or "udp:ip="fe80::226:24ff: fe43:8235."" The media router then starts and waits for a sink event. The sink event should contain the destination URL to forward to the client. At this point, the service should be able to set the cookie in the http header and forward the client to the correct URL.

Described herein is client disconnect detection. When a client connects to the Media Player web service, resources are allocated on-demand. In order to allow for the maximum use of resources, the allocations must be released at the earliest time possible. However, with httplive, it may be difficult to determine when those resources are no longer in use and may be freed.

The client is requesting two types of resources: the playlist and the file segments. If a client pauses video playback, they may discontinue download of files and disconnect from the http output server. However, the client may reconnect at any point without discontinuous play so long as they do not miss any segments within the sliding playlist window. There is no mechanism to determine the difference between a disconnected client who will not return and a client who is simply paused and plans to resume. A best effort algorithm must be employed.

For the httplive algorithm, the playlist duration parameter determines the amount of time the httplive sliding window is set. As such, that determines the amount of time a client may go without a request and still guarantee that it will not miss a media segment. To make a best effort video deliver versus resource utilization strategy, it is assumed that once a client has been disconnected long enough that a playback discontinuity would occur. The resources may be freed and the redirect URL for the playlist is no longer valid.

For example, a counter is created and initialized to zero for each httplive output service. A single service may support multiple connected clients. Accompanying mutex and condition variables are also created. When a new http request is made, the mutex is acquired and the counter is incremented. The condition is then signaled. When an http request is complete, either successfully or in error, the mutex is acquired and the counter is decremented. The condition is then signaled.

A thread monitors the condition. If the counter is greater than zero, the thread will wait indefinitely for the condition to be signaled. If the counter reaches zero, the thread will wait for 2× the playlist duration. If the thread reaches the timeout, a message is generated.

When the message reaches the web service, the web service may choose to either destroy the resources immediately or leave them allocated until a new request comes in. A delayed cleanup would allow for higher potential quality of service when resource contention is high.

For a http algorithm, because an HTTP output must be connected for the client to maintain video, a simpler algorithm will suffice. The same basic idea is employed as HTTP Live but a static timeout of 5 seconds is utilized.

Figure 3:
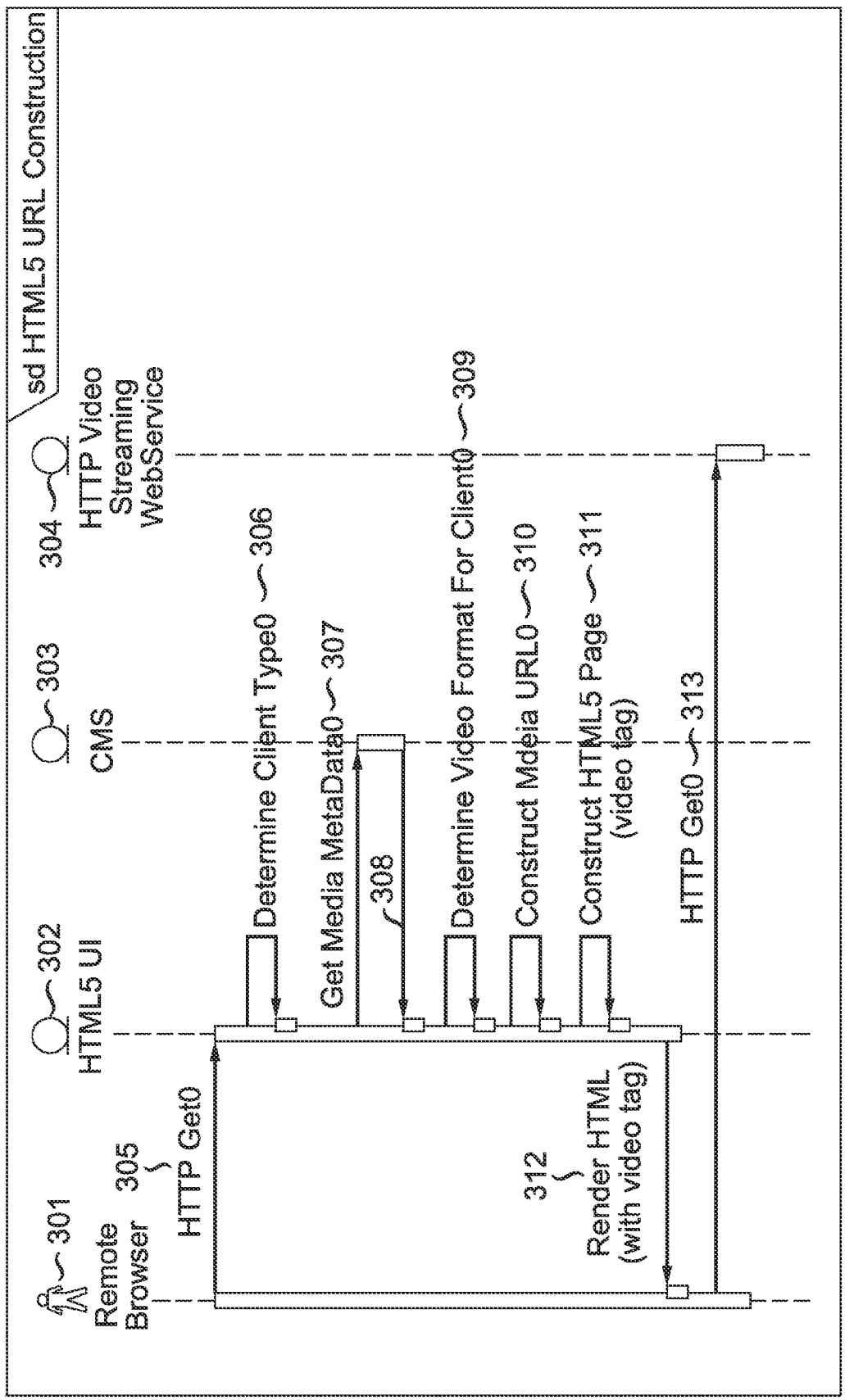
FIG. 3 is a flow chart of HTML5 URL construction utilized with the invention.

FIG. 3 is an HTML5 URL construction. Remote browser 301 transmits HTTP get 305 to HTML5 UI 302. HTML5 UI 302 determines client type 306. HTML5 UI 302 transmits a get media metadata 307 message to Content Management Server (CMS) 303. CMS 303 transmits get media metadata 308 to HTML5 UI 302. HTML5 UI 302 determines video format for client 309 and constructs a media URL 310. HTML5 UI 302 constructs an HTML 5 page with video tag 311 and renders the HTML with video tag 312 at remote browser 301. Remote browser 301 transmits HTTP get 313 to HTTP video streaming WebService 304.

Figure 4:
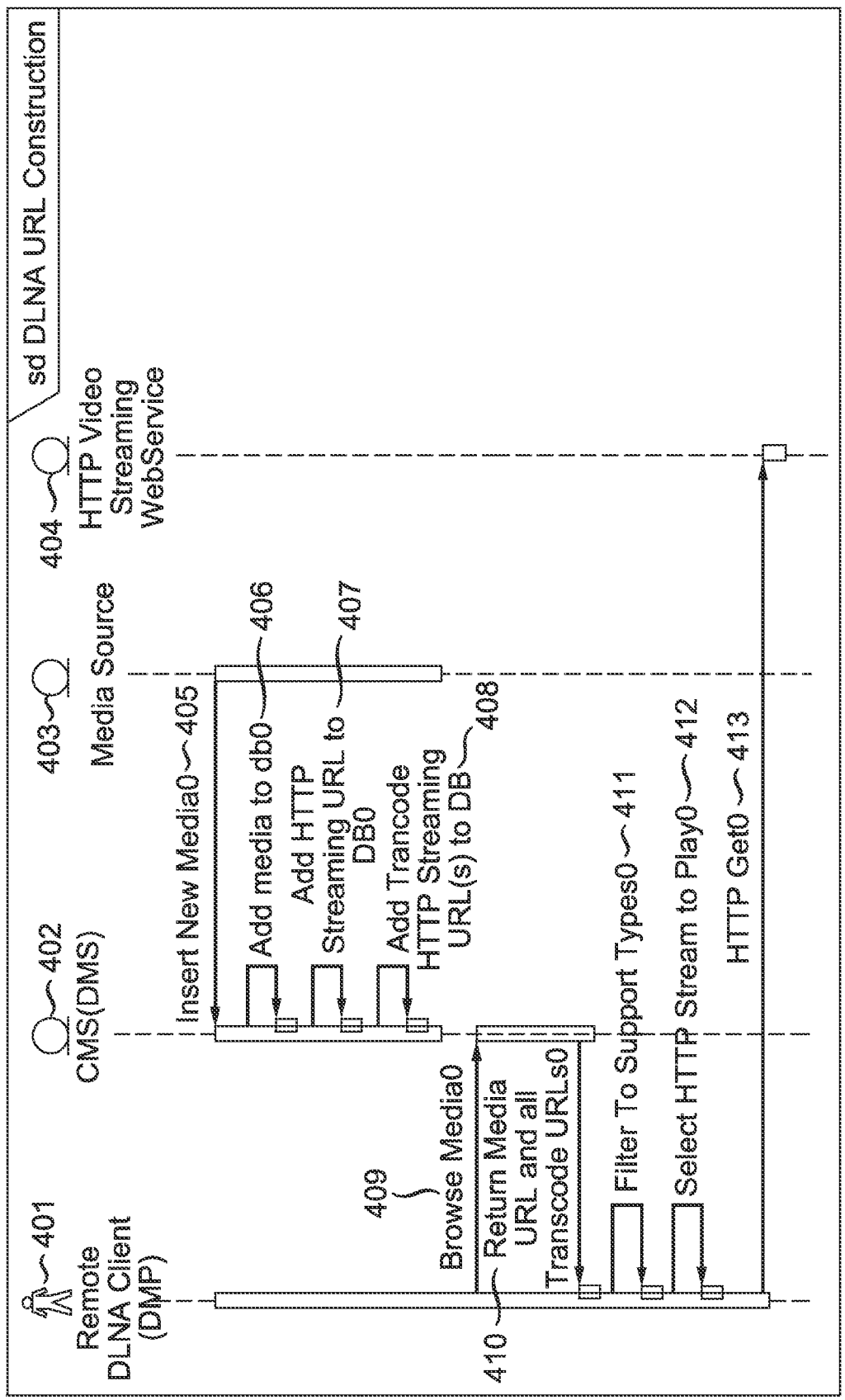
FIG. 4 is a flow chart of DLNA URL construction utilized with the invention.

FIG. 4 is a Digital Living Network Alliance (DLNA) URL construction. Media source 403 inserts new media 405 into CMS 402, for example a Digital Media Server (DMS). CMS 402 adds media to database (db) 406 and adds HTTP streaming URL to db 407. CMS 402 adds transcode HTTP streaming URL to db 408. Remote DLNA client, for example a digital media player (DMP), transmits browse media 409 to CMS 402. CMS 402 returns media URL and all transcode URLs 410 to remote DLNA client 401. Remote DLNA client 401 filters to supported types 411. Remote DLNA client 401 selects HTTP stream to play 412. Remote DLNA client 401 transmits HTTP get 413 to HTTP video streaming WebService 404.

While embodiments of the invention have been described, it will be appreciated that modifications of these embodiments are within the true spirit and scope of the invention. The invention is not limited to any particular element(s) that perform(s) any particular function(s) and some may not necessarily occur in the order shown. For example, in some cases two or more method steps may occur in a different order or simultaneously. Although illustrated in the context of separate functional elements, these functional elements may be embodied in one, or more, integrated circuits (ICs). Similarly, although shown as separate elements, any or all of the elements may be implemented in a stored-program-controlled processor, e.g., a digital signal processor, which executes associated software, e.g., corresponding to one, or more, of the functions. These and other variations of the methods disclosed herein will be readily apparent, especially in view of the description of the method described herein, and are considered to be within the full scope of the invention.

The invention claimed is:

1. A method for streaming content, the method comprising:
   creating and initializing a counter for a streaming output service;
   receiving a request for streaming content;
   incrementing the counter in response to receiving the request for streaming content;
   signaling a condition based on the counter, the condition including whether a monitoring process has timed out;
   monitoring the condition using a processor;
   detecting a disconnect state based on whether the counter satisfies the condition; and
   creating a detection message, wherein the condition is that the counter equals zero, and wherein the monitoring process waits for a multiple of a playlist duration.

2. The method of claim 1, further comprising decrementing the counter on a condition that the request for streaming content is complete.

3. A system for streaming content, comprising:
   a counter for a streaming output service, the counter being incremented in response to receiving a request for streaming content; and
   a processor monitors the counter with respect to a condition that includes a monitoring process timing out, detects a disconnect state based on whether the counter satisfies the condition, and creates a detection message, wherein the condition is that the counter equals zero, and wherein the processor will wait for a multiple of a playlist duration.

4. The method of claim 3, wherein the processor decrements the counter on a condition that the request for streaming content is complete.

* * * * *